Aug. 29, 1950     H. F. SMITH     2,520,575
FLUSH TANK AND BOWL COMBINATION

Filed Nov. 4, 1948

INVENTOR.
HARRY FORD SMITH
BY
Richey & Watts
ATTORNEYS

Patented Aug. 29, 1950

2,520,575

UNITED STATES PATENT OFFICE 2,520,575

FLUSH TANK AND BOWL COMBINATION

Harry Ford Smith, Lexington, Ohio, assignor to Mansfield Sanitary Pottery, Inc., Perrysville, Ohio, a corporation of Ohio Application November 4, 1948, Serial No. 58,342

9 Claims. (Cl. 4—12)

This invention relates generally to flush tank and bowl combinations and particularly to such a combination in which a combined spud and valve seat serves not only the functions of a spud and a valve seat but also serves as a means for permitting ready and easy adjustment of the tank for leveling the tank and aligning its outlet passage with the inlet passage of the bowl.

In prior flush tank and bowl combinations it has been common to rest the tank directly on the bowl and to use a gasket to seal the water passage from one to the other and to use a separate valve seat for the flush valve. Since it was practically impossible to make bowls and tanks entirely free from warpage and uneven surfaces, the tank could seldom be made level and there was no means for ready leveling or adjustment of the tank. Moreover, the use of separate spuds and valve seats necessitated multiplicity of parts and this number was increased if and when shims were provided for use between the tank and bowl.

The present invention provides a new combined spud and valve seat which permits ready positioning of the tank relative to but out of direct contact with the bowl, makes possible the leveling of the tank without the use of shims and regardless of warpage or uneven surfaces on the tank and bowl, seals against leakage of water from the passage from tank to bowl and acts as a seat for the flush valve.

In the drawings attached hereto and forming a part of this specification:

Figure 1:
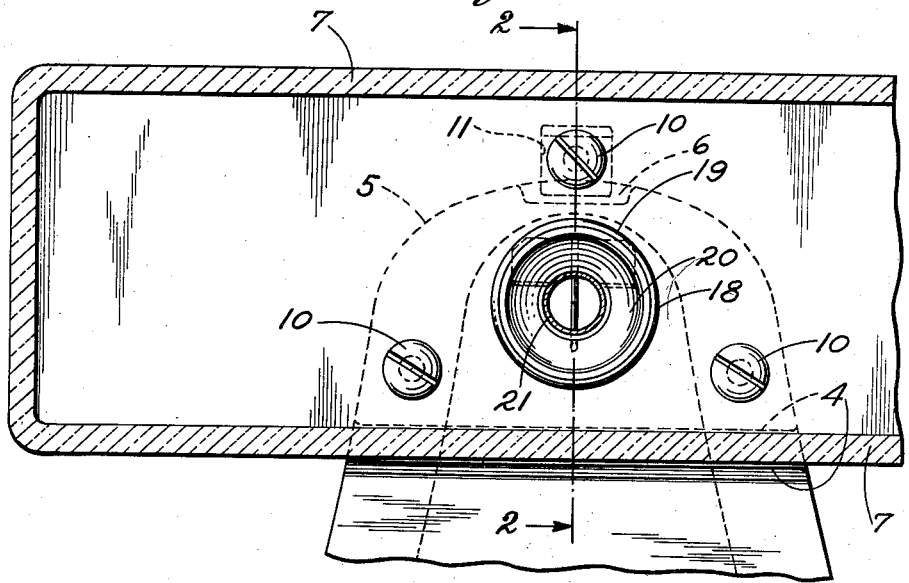
Fig. 1 is a fragmentary top plan view of a tank and bowl combination embodying the present invention and including a new spud and seat constituting a part of this invention.
Figure 2:
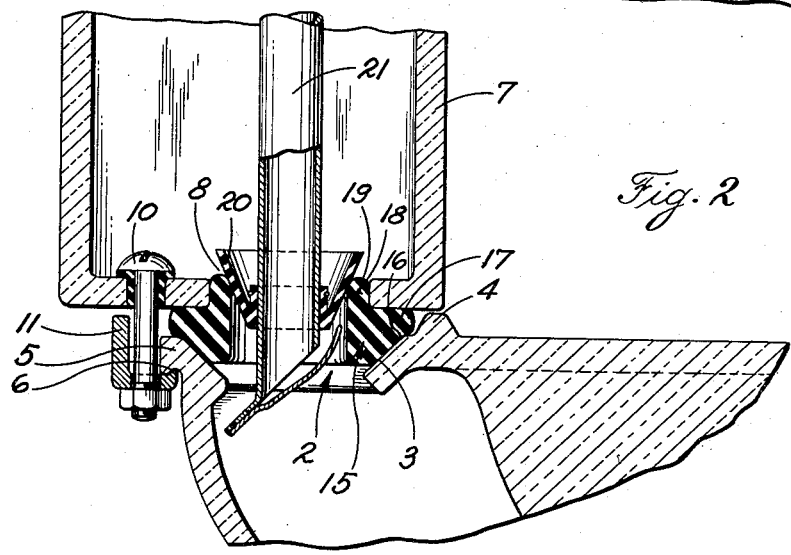
Fig. 2 is a fragmentary vertical section taken on line 2—2 of Fig. 1.
Figure 3:
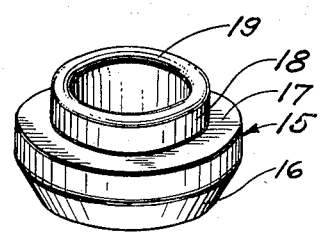
Fig. 3 is a perspective view of the combined spud and seat.

In Figs. 1 and 2, the bowl 1 is provided with a water inlet passage 2 defined by an annular surface 3, which may be conical or spherically shaped, and with a lip 4 extending upwardly from the top of the bowl and parallel with the front wall of the tank, and with an outwardly projecting flange 5 which is partly cut away and is undercut to form a recess 6. Tank 7 is positioned over bowl 1, has an outlet passage 8 in its bottom wall to be aligned with the bowl inlet passage 2 and is provided with a plurality of securing means, in this case three bolts 10, extending through the bottom of the tank. The side bolts extend through flange 5 while the middle or rear bolt is provided with a clip 11 which seats in recess 6 and a nut 12 to bear against the clip.

The combined spud and valve seat 15 is annular and is preferably composed of resilient material, for example rubber. It has an outer surface 16 near its lower end which is preferably shaped to correspond with surface 3. It has an enlarged outwardly extending, flange-like portion 17 between its ends to press against the lower surface of the bottom wall of tank 7 and it has an upper cylindrical end portion 18 to project into the passage 8 through the bottom wall of the tank to align that passage with passage 3 of the bowl. The upper end surface of annulus 15 is preferably rounded, as at 19, to form an initial line contact with a flush valve 20.

As illustrated, the flush valve 20 is a resilient cup having a conical outer surface to engage the surface 19 of the spud 15 and is mounted on a refill pipe 21. It will be understood however, that any other valve capable of cooperating with an annulus to form a seal for a flush tank may be used in place of the valve 20.

In assembling the parts shown in Figs. 1 and 2, and just described, the combined spud and valve seat 15 is laced with its lower outer surface 16 resting on surface 3 of the bowl, and the tank is placed on annulus 15 with flange 17 engaging the bottom surface of the tank and end portion 18 projecting into passage 8. Bolts 10 are assembled with the tank and bowl and the clip 11 is pressed into recess 6 by nut 12. If the tank is not level at this stage of the assembly, it is leveled manually by rocking the tank to one side or the other, or forward or backward. The member 15 shifts with the tank as its position is changed relative to bowl 1, particularly when surface 3 of the bowl and surface 16 of the annulus are segments of spherical surfaces of substantially the same radii. When the tank is level, the nuts 12 are tightened on bolts 10 and the flange 17 of member 15 is compressed between the tank and bowl and seals the water passage from the tank into the bowl against escape of liquid between these two parts. Since the annulus spaces the bowl and tank apart it serves as a resilient support for the tank which not only compensates for warpage of, or uneven surfaces on, either the tank or bowl, but also absorbs shocks in use. If the tank should be shifted out of its level position in use, it may readily be readjusted by simply loosening nuts 12, re-leveling the tank and then tightening the nuts.

Having thus described the present invention so that others skilled in the art may be able to understand and practice the same, I state that what I desire to secure by Letters Patent is defined in what is claimed.

What is claimed is:

1. An integral spud and valve seat to serve as a supporting spacer for a flush tank and bowl combination comprising a resilient annulus having a central portion, a lower end portion having a downwardly converging outer surface to extend into a water inlet opening of the bowl, and an upper end portion to extend into a water outlet opening of the tank and having an upper end surface shaped to constitute a seat for a flush valve.

2. An integral spud and valve seat to serve as a supporting spacer for a flush tank and bowl combination comprising a resilient annulus having a central portion, a lower end portion having a downwardly converging outer surface to extend into a water inlet opening of the bowl, and a cylindrical upper end portion to extend into a water outlet opening of the tank and having an upper end surface shaped to constitute a seat for a flush valve.

3. An integral spud and valve seat to serve as a supporting spacer for a flush tank and bowl combination comprising a resilient annulus having a central portion, a lower end portion having a downwardly converging convex outer surface to extend into a water inlet opening of the bowl, and a cylindrical upper end portion to extend into a water outlet opening of the tank and having an upper end surface shaped to constitute a seat for a flush valve.

4. An integral spud and valve seat to serve as a supporting spacer for a flush tank and bowl combination comprising a resilient annulus having a central portion with an outwardly projecting flange to rest on the said bowl and support and space the tank therefrom, a lower end portion having a downwardly converging outer surface to extend into a water inlet opening of the bowl, and an upper end portion to extend into a water outlet opening of the tank and having an upper end surface shaped to constitute a seat for a flush valve.

5. A flush tank and bowl combination comprising a bowl having a water inlet opening defined by an annular surface, a tank having a water outlet opening, a resilient annulus having a downwardly converging outer surface near its lower end to seat on said annular surface about said inlet opening and permit leveling of said tank, a cylindrical upper portion to extend into and align said water outlet opening with said inlet opening, and adjustable means engaging said tank and bowl for holding said parts in assembled operative position with said annulus.

6. A flush tank and bowl combination comprising a bowl having a water inlet opening defined by an annular surface, a tank having a water outlet opening, a resilient annulus having a downwardly converging outer surface near its lower end to seat on said annular surface about said inlet opening and permit leveling of said tank, a cylindrical upper portion to extend into and align said water outlet opening with said inlet opening, and a valve seating surface at its upper end, a valve seatable on said seating surface, and adjustable means engaging said tank and bowl for holding said parts in assembled operative position with said annulus.

7. A flush tank and bowl combination comprising a bowl having an inlet water opening defined by an annular surface, a tank having a water outlet opening, a resilient annulus having a downwardly converging outer surface near its lower end to seat on said annular surface about said inlet opening and permit leveling of said tank, a cylindrical upper portion to extend into and align said water outlet opening with said inlet opening, and a plurality of bolts and clips engaging said tank and bowl for holding said parts in assembled operative position with said annulus.

8. A flush tank and bowl combination comprising a bowl having an inlet water opening defined by an annular surface, and a ledge having an upwardly extending recess in its rear portion, a tank having a water outlet opening, a resilient annulus having a downwardly converging outer surface near its lower end to seat on said annular surface about said inlet opening and permit leveling of said tank, an intermediate outwardly projecting portion to bear against the lower surface of said tank about said outlet opening, a cylindrical upper portion to extend into and align said water outlet opening with said inlet opening, and adjustable means for holding said parts in assembled operative position with said annulus, said means including bolts arranged in a circle about 120° apart, certain of said bolts extending through said ledge and one bolt having a clip engaging in said upwardly extending recess.

9. A flush tank and bowl combination comprising a bowl having an inlet water opening defined by an annular surface, a tank having a water outlet opening, a resilient annulus having a downwardly converging outer surface near its lower end to seat on said annular surface and to permit leveling of said tank, a cylindrical upper portion to extend into and align the said outlet opening with said inlet opening, said upper portion having a valve seating surface at its upper end, a valve seatable on said seating surface, and means engaging said tank and bowl for holding said parts in assembled operative position with each other and with said annulus.

HARRY FORD SMITH.

REFERENCES CITED

The following references are of record in the file of this patent:

UNITED STATES PATENTS

| Number | Name | Date |
| --- | --- | --- |
| 830,243 | Magowan | Sept. 4, 1906 |